(12) United States Patent
Palmer

(10) Patent No.: US 11,549,304 B2
(45) Date of Patent: Jan. 10, 2023

(54) WALL PORT COVER RETENTION ASSEMBLY

(71) Applicant: Austin Palmer, Pickering (CA)

(72) Inventor: Austin Palmer, Pickering (CA)

( * ) Notice: Subject to any disclaimer, the term of this patent is extended or adjusted under 35 U.S.C. 154(b) by 280 days.

(21) Appl. No.: 16/843,844

(22) Filed: Apr. 8, 2020

(65) Prior Publication Data
US 2020/0318417 A1    Oct. 8, 2020

Related U.S. Application Data
(60) Provisional application No. 62/830,824, filed on Apr. 8, 2019.

(51) Int. Cl.
| | | |
|---|---|---|
| *F24F 13/08* | (2006.01) | |
| *E06B 1/60* | (2006.01) | |
| *F16B 1/04* | (2006.01) | |
| *F24F 1/0057* | (2019.01) | |

(52) U.S. Cl.
CPC .............. *E06B 1/6038* (2013.01); *F16B 1/04* (2013.01); *F16B 2200/503* (2018.08); *F24F 1/0057* (2019.02)

(58) Field of Classification Search
CPC ........ F24F 13/08; F24F 13/082; F24F 13/084; F24F 13/085; F24F 13/20; Y10T 292/0806
See application file for complete search history.

(56) References Cited

U.S. PATENT DOCUMENTS

| | | | | |
|---|---|---|---|---|
| 2,584,706 | A * | 2/1952 | Hulsey, Jr. ................ | E06B 9/01 49/55 |
| 3,187,526 | A * | 6/1965 | Moler ..................... | E05C 9/043 292/7 |
| 3,504,618 | A * | 4/1970 | Rosner .................... | F24F 13/08 292/7 |
| 4,468,943 | A * | 9/1984 | Beattie ............... | E05B 65/0075 70/315 |
| D285,480 | S * | 9/1986 | Schulz ........................ | D23/392 |
| 4,639,021 | A * | 1/1987 | Hope ..................... | E05C 9/043 292/7 |
| 5,071,176 | A * | 12/1991 | Smith ...................... | E05C 9/16 292/7 |
| 5,150,934 | A * | 9/1992 | Grody .................... | E05C 19/18 292/288 |
| 5,183,310 | A * | 2/1993 | Shaughnessy ........... | E05C 5/04 292/DIG. 43 |

(Continued)

*Primary Examiner* — Daniel J Wiley
(74) *Attorney, Agent, or Firm* — Laurie C. Wright; Christopher N. Hunter; Blake, Cassels & Graydon LLP

(57) ABSTRACT

There is provided a wall port cover to be installed in building wall ports. Wall ports are simply openings in a wall or ceiling of a building which may be used to house electrical panels, HVAC systems, access panels, lighting switches, and the like. The wall port cover comprises an engagement means which is rotatable between an engaging position and a releasing position. In the engaging position, the engaging means extend beyond the wall port cover to engage a top surface of the wall or ceiling drywall panel to support and retain the wall port cover within the vent opening. In the releasing position, the engaging means are retracted within the wall port cover to disengage from the top surface of the wall or ceiling drywall panel to allow the wall port cover to be removed from the vent openings.

14 Claims, 14 Drawing Sheets

(56) References Cited

U.S. PATENT DOCUMENTS

| 6,322,442 B1* | 11/2001 | Cordell | F24F 13/06 |
| | | | 454/325 |
| 8,419,515 B1* | 4/2013 | Dillon | F24F 13/084 |
| | | | 454/284 |
| 2016/0153680 A1* | 6/2016 | Zhong | F24F 13/084 |
| | | | 454/331 |

* cited by examiner

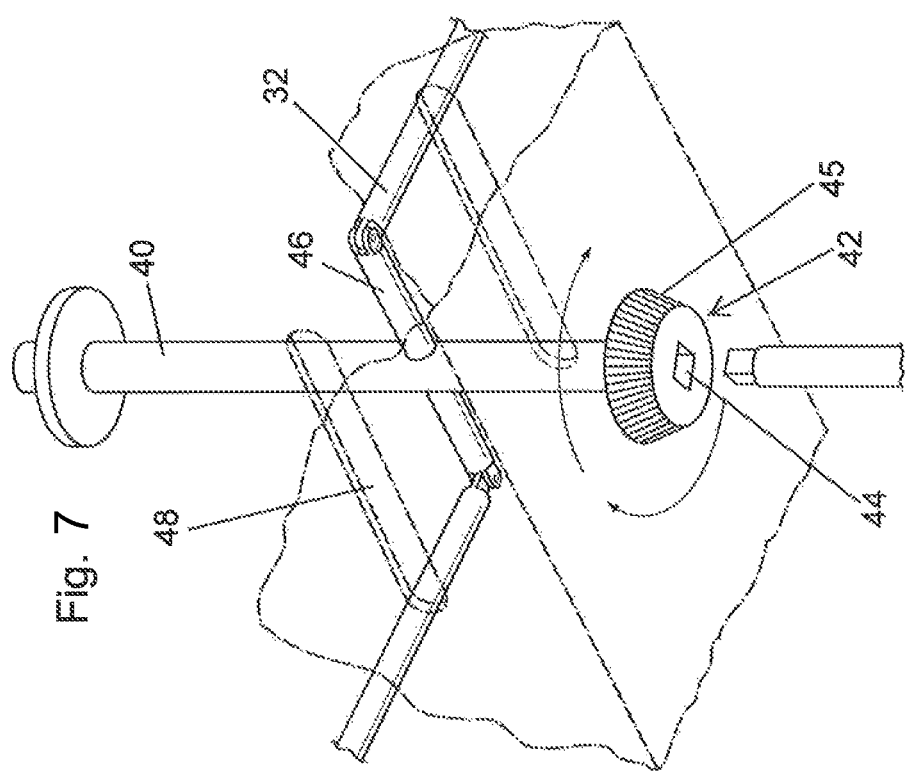
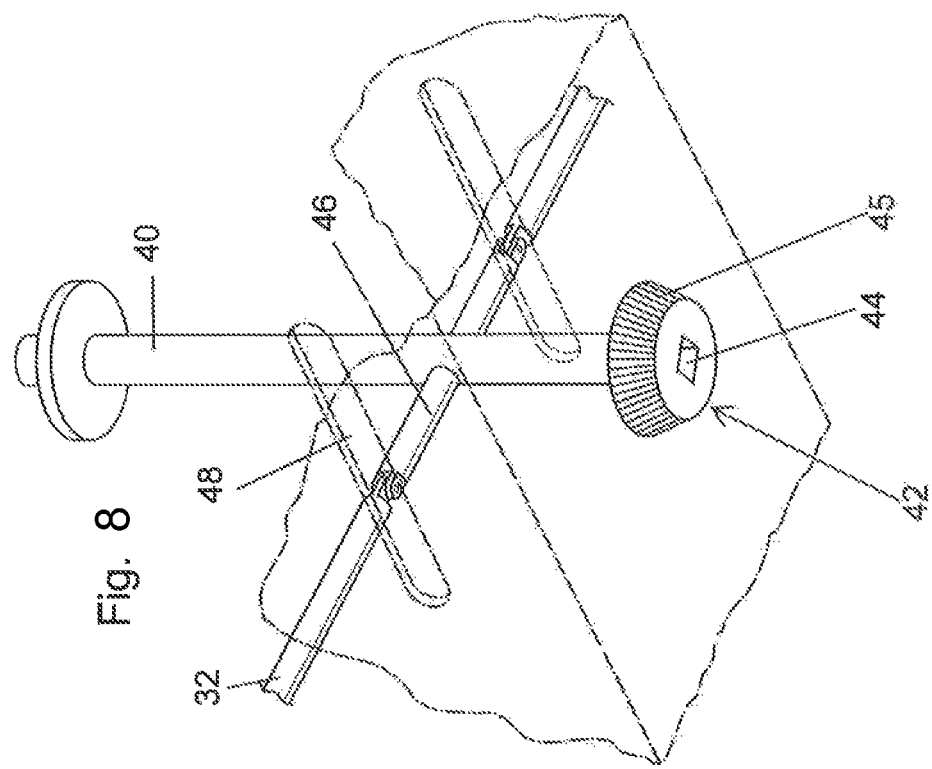

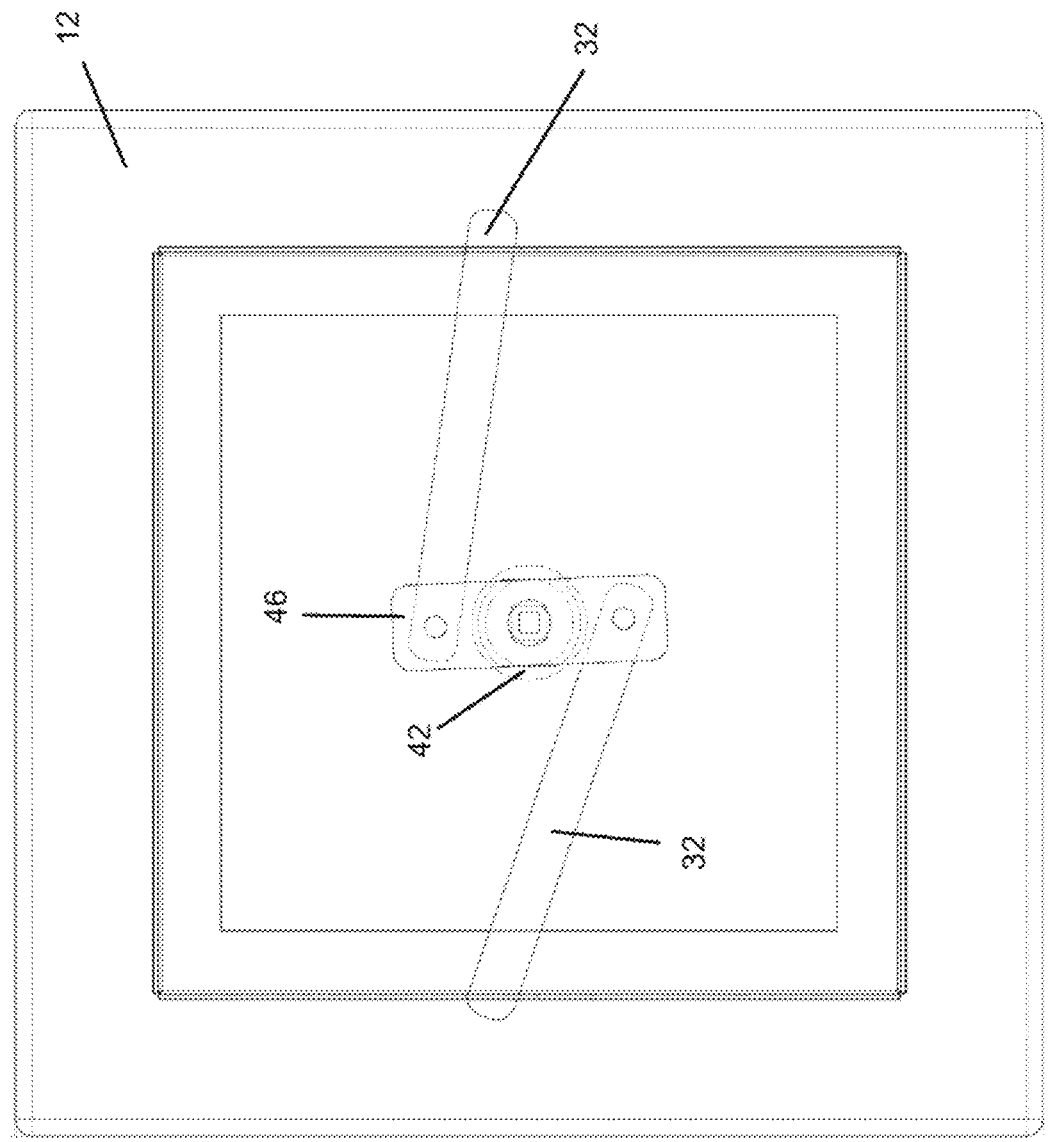

WALL PORT COVER RETENTION ASSEMBLY

CROSS REFERENCE TO RELATED APPLICATIONS

This application claims benefit of priority to U.S. Provisional Patent Application No. 62/830,824 filed on Apr. 8, 2019 hereby incorporated by reference herein in its entirety.

FIELD OF THE INVENTION

The present invention generally relates to a cover for wall ports and more specifically relates to wall port covers which are installed in wall openings without the need of permanent fasteners.

BACKGROUND OF THE INVENTION

There are many types of wall ports which exist in a building. Wall ports are simply openings in a wall or ceiling of a building which may be used to house electrical panels, HVAC (heating, ventilation & air conditioning) systems, access panels, lighting switches, and the like. Wall ports are covered as they are unsightly or for functional reasons, for example, to provide adjustable ventilation, to be secured from dust, or to control access to the wall port.

For example, HVAC systems installed in buildings generally provide heated, cooled or conditioned air into various rooms of a building. An air handling unit is the main unit of the HVAC system that comprises the furnace or air conditioner and provides the heated, cooled or conditioned air. Typically, air vents or ducts move air from the air handling unit to the various rooms of a building. The air vents terminate at opening located at the terminal end of the vent, for air output into a specific room. The vent openings are generally covered with a louvered vent cover which is installed in the vent opening. Vent openings can be located in floors, walls or ceilings of the various rooms in a building. This is to provide the most efficient route from the HVAC air handling unit. For example, if the air handling unit is located on the ground floor of a 3-storey building, floor vents can be provided on the upper floor, ceiling vents can be provided in the basement and wall vents can be provided on the ground floor of the building.

The typical louvered vent covers are easily retained in floor vent openings by gravity. However, for vents provided in walls or ceilings, it is necessary to attach the vent cover to the wall or ceiling such that the vent cover is retained within the vent opening. Typically, vent covers are attached to the wall or ceiling through the use of fasteners such as screws, nails, or adhesives. However, the use of fasteners can present some difficulties in attaching the vent cover to the vent opening. For example, the vent opening may not be adjacent to a framing member (i.e. a stud) to provide proper attachment of the screws. Furthermore, screws, nails and adhesives may cause permanent damage to the walls or ceilings.

To overcome these problems, in some instances, a larger vent cover can be fit into a smaller vent opening to provide a tension-fit attachment. However, this may not be feasible if the vent opening is too large. Furthermore, there is a risk of having the vent cover fall from the ceiling or the wall and hurt someone or damage property.

Similarly, or access panels for vent cleaning or electrical panels are generally located on the wall covered sometimes with a door panel. The door may open unexpectedly, and the electrical panel may be accessible by children or other adults not authorized access.

Thus, there remains a need for a wall port cover which is easy to install and stays within the vent opening without permanent fasteners such as screws, nails or adhesives, etc.

SUMMARY OF THE INVENTION

In one aspect, there is provided a wall port cover which can be installed in vent openings. The wall port cover is removably attachable to the vent opening. The wall port cover comprises an engagement means which is rotatable between an engaging position and a releasing position. In the engaging position, the engaging means extend beyond the wall port cover to engage a top surface of the wall or ceiling drywall panel to support and retain the wall port cover within the vent opening. In the releasing position, the engaging means are retracted within the wall port cover to disengage from the top surface of the wall or ceiling drywall panel to allow the wall port cover to be removed from the vent openings. Preferably, the engaging means are operable by an engaging means control comprising a head located below and exposed to the lower surface of the wall port cover. The head is provided with a rotating portion which rotates the head, the engaging means control and the engaging means between the engaging position and the releasing position.

BRIEF DESCRIPTION OF THE DRAWINGS

Preferred embodiments of the present invention are illustrated in the attached drawings in which:

FIG. 7 is a detailed view of the engaging means control and the engaging means in the released position;

FIG. 8 is a detailed view of the engaging means control, and the engaging means shown in FIG. 7 in the engaged position;

FIG. 13 is a top plan view of a sixth embodiment of the wall port cover shown in isolation;

DETAILED DESCRIPTION OF THE PREFERRED EMBODIMENTS

The present invention provides a wall port cover which can be installed in vent openings. The wall port cover may be installed in any vent opening however, it is particularly meant to cover wall vents and ceiling vents as it comprises a mechanism which removably attaches the wall port cover to a vent opening in the wall or ceiling. The wall port cover is provided with and engaging means which is rotatable between an engaging position and a releasing position. In the engaging position, the engaging means extend beyond the wall port cover and engage a top or inside surface of the wall or ceiling drywall panel to support and retain the wall port cover within the vent opening. In the releasing position, the engaging means are retracted within the wall port cover to disengage from the top or inside surface of the wall or ceiling drywall panel to allow the wall port cover to be easily removed from the vent opening.

Figure 1:
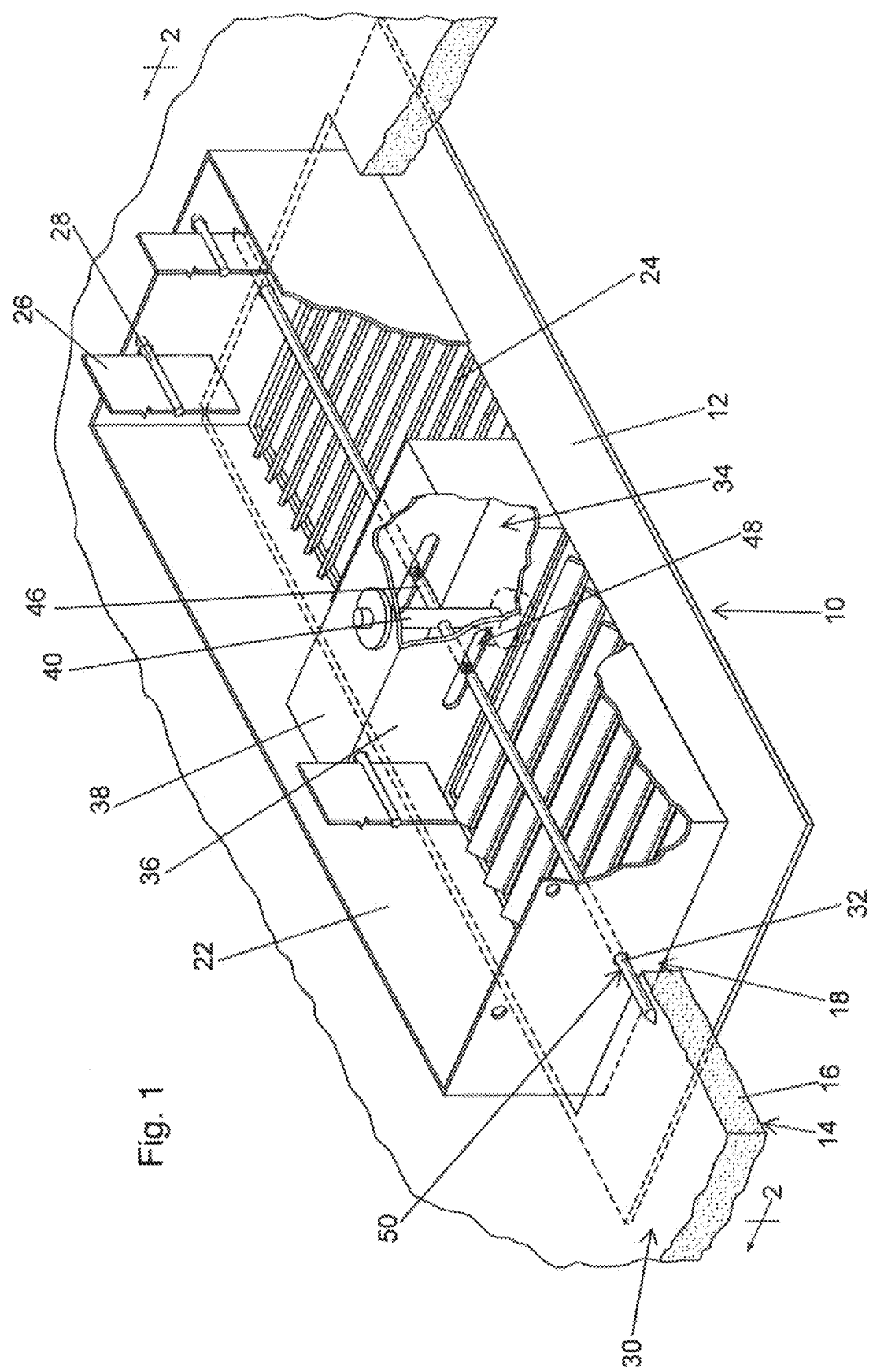
FIG. 1 is a perspective view of a first embodiment of a wall port cover installed within a vent opening in a ceiling.

FIG. 1 illustrates a first embodiment of the wall port cover 10, attached in a ceiling vent. Though FIG. 1 illustrates the embodiment in which the wall port cover is attached to a ceiling vent, it can be appreciated that the wall port cover may similarly be used to cover a wall vent or alternatively a floor vent. Typically, the ceiling or walls will be covered with drywall panels 16 attached to framing members (not shown) of a building. The drywall panels generally comprise the lower surface 14 (or outer surface for wall panels) and a top surface 30 (or inner surface for wall panels). The drywall panels also comprise an opening 18 in which the wall port cover 10 is to be installed. The wall port cover 10 comprises a flange 12 extending outwardly from the lower edge of the wall port cover 10 to engage or cover a lower surface 14 of the drywall panel 16. The wall port cover 10 includes upstanding walls 22 extending upwardly from the flange 12 to extend into the opening 18 and engage or fit within the inside surface of the vent 20 (as illustrated in FIG. 2).

Figure 2:
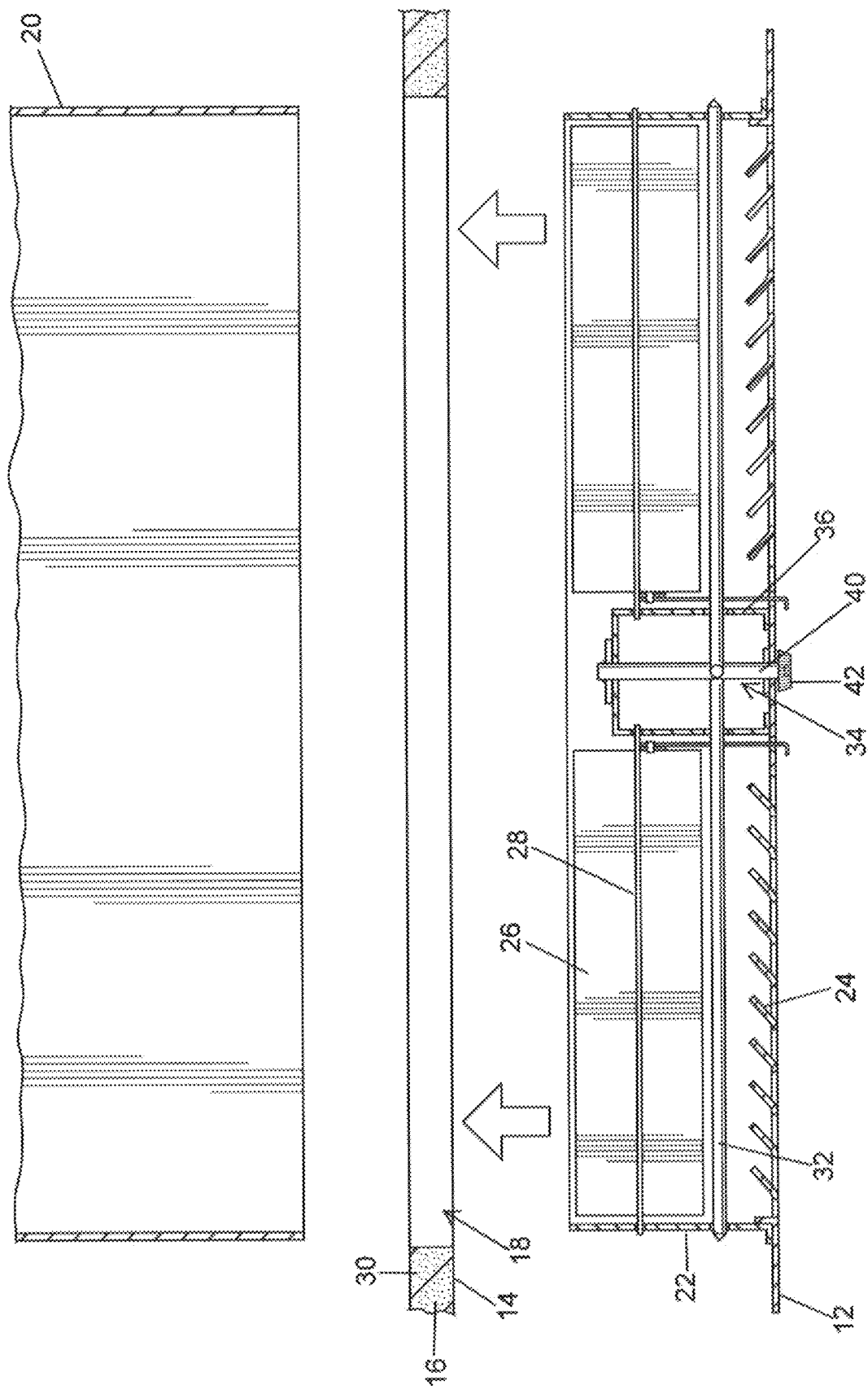
FIG. 2 is a cross-sectional view of the wall port cover shown in FIG. 1 being inserted into the vent opening of the ceiling, taken along line 2-2 of FIG. 1.

FIG. 2 illustrates a cross-sectional view of the wall port cover being inserted into the vent opening of the ceiling. The drywall panel 16 is provided with an opening 18 which aligns with the vent 20 of the HVAC system. In one embodiment, the wall port cover 10 is provided with louvers 24 in order to provide for proper distribution of the air flowing from the vent 20, as is known in the art. Optionally, a second set of louvers 26 can be provided to open and close the space within the walls 22 of the wall port cover 10, and to regulate the flow of air from the vent 20 into the occupied space. The second louvers 26 are provided as is known in the art. The second louvers 26 may be connected to a rotatable connection 28 which can rotate the louvers 26 to open or close the flow of air through the wall port cover 10 and regulate the airflow through the wall port cover 10. In one embodiment, the first set of louvers is simply a set of slits 24 each side of a rotatable connection 28 and the second louvers 26 are generally flat bars, connected by a frame making a panel with slits therein, which can be moved laterally within the wall port cover to partially or completely cover a set of slits in the wall port cover. In this embodiment a sliding mechanism 56 would be provided on the outside of the wall port cover to facilitate sliding of the bars located on the inside of the wall port cover. Either one sliding mechanism or two sliding mechanisms (one for each set of bars on each side of the rotatable connection 28), could be provided.

Figure 3:
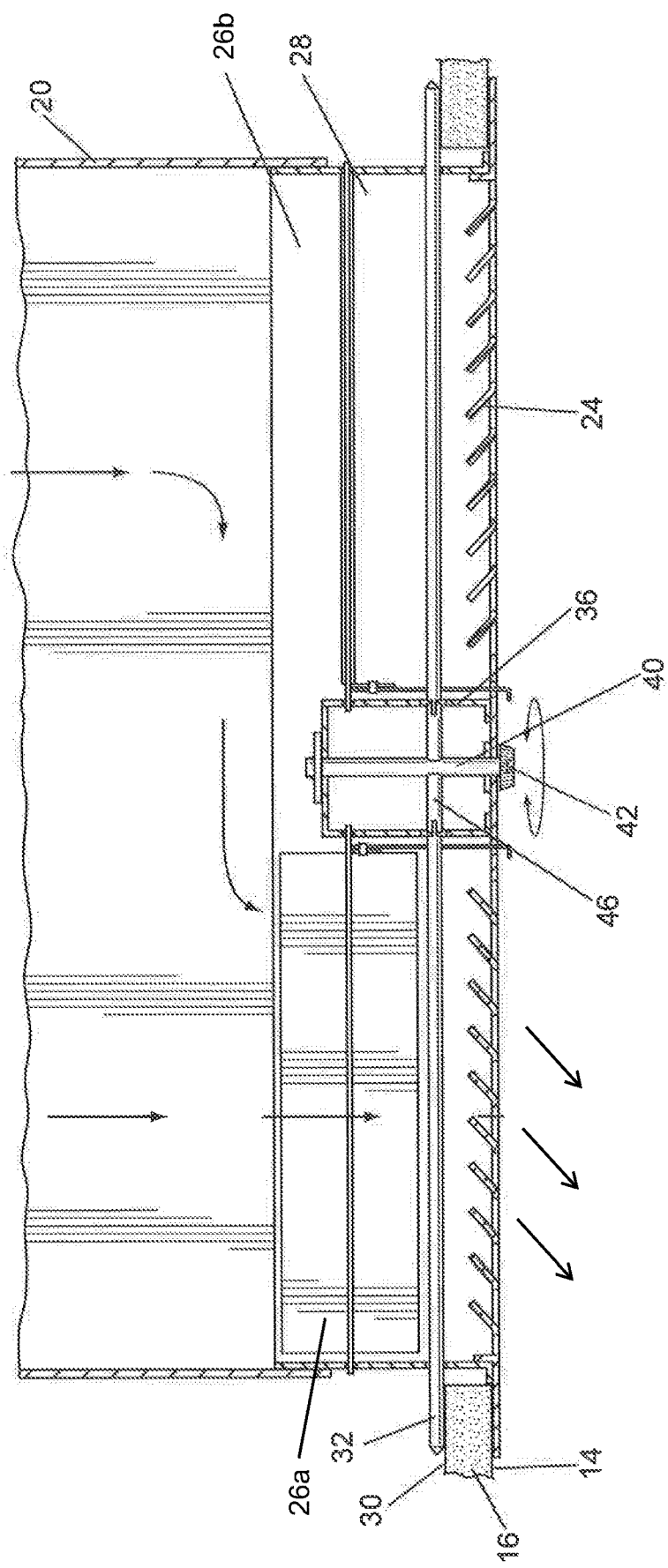
FIG. 3 is a cross-sectional view of the wall port cover shown in FIG. 1 installed in the vent opening of the ceiling, taken along line 2-2 of FIG. 1.

The rotatable connection 28 may be connected to a control (not shown) which is known in the art. The first and second louvers 24, 26 also optionally direct the flow of air (indicated by the arrows in FIG. 3) from the vent 20 into the room. FIG. 3 provides a cross-sectional view of the wall port cover installed in the vent opening of the ceiling. In this embodiment, second louvres 26 comprise two independently controlled fins 26a, 26b. The first fin 26a is shown as perpendicular to the direction of airflow, in an open position, allowing air to flow out. The second fin 26b is shown as parallel to the direction of airflow, in a closed position, prohibiting air from flowing out. This allows the air to redirect and flow from the first fin 26a. Optionally, the first and second fins may both be in a closed position, prohibiting air from flowing or, they may both be open allowing air to flow out. The first louvres 24 angle the airflow direction. This can be useful for pointing the air towards a specific part of a room. For example, in FIG. 3, the first louvres are angled to the left, directing the air towards the left side of the room.

Figure 4:
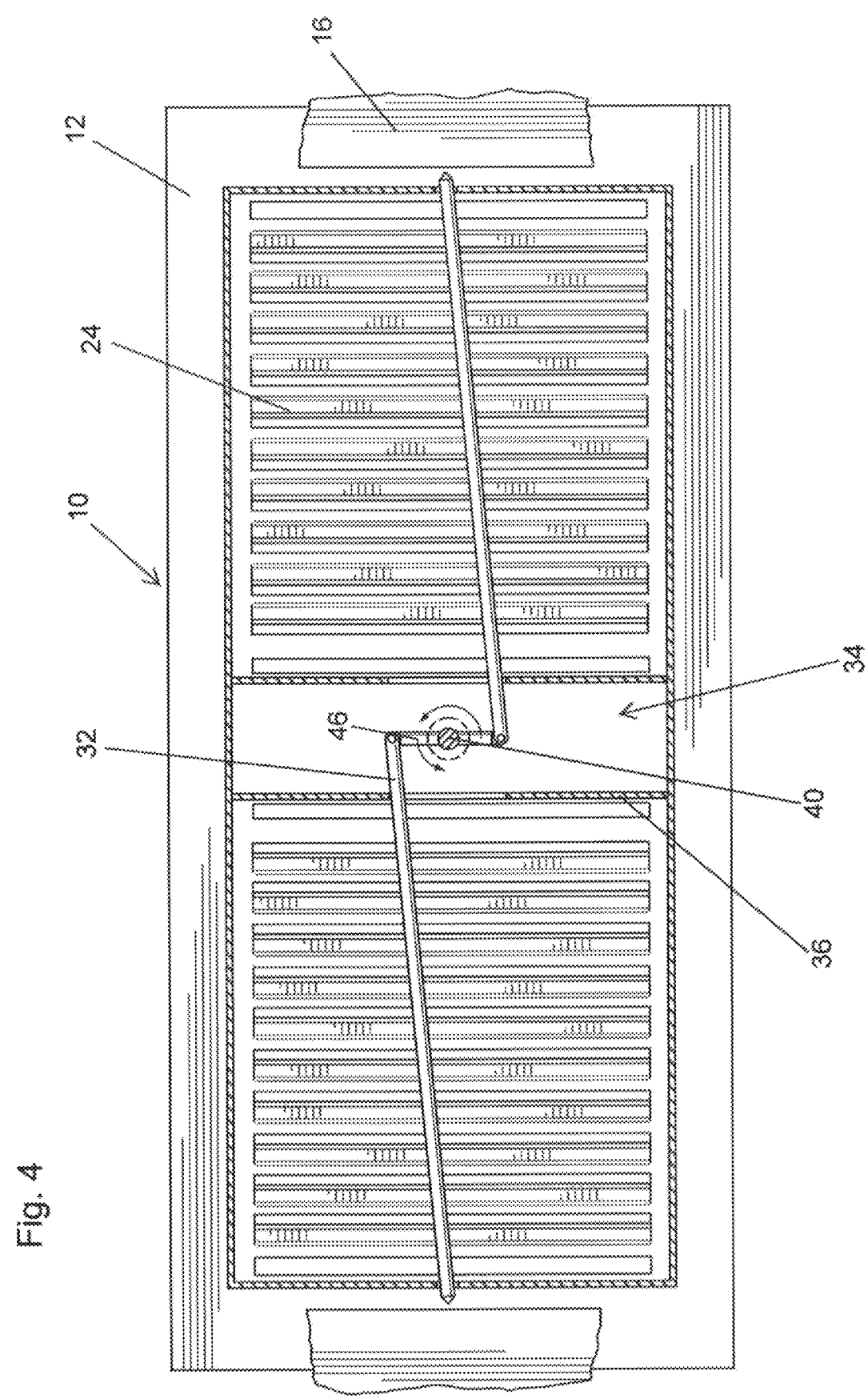
FIG. 4 is a top plan view of the wall port cover shown in FIG. 1 being installed in the vent opening of the ceiling.
Figure 5:
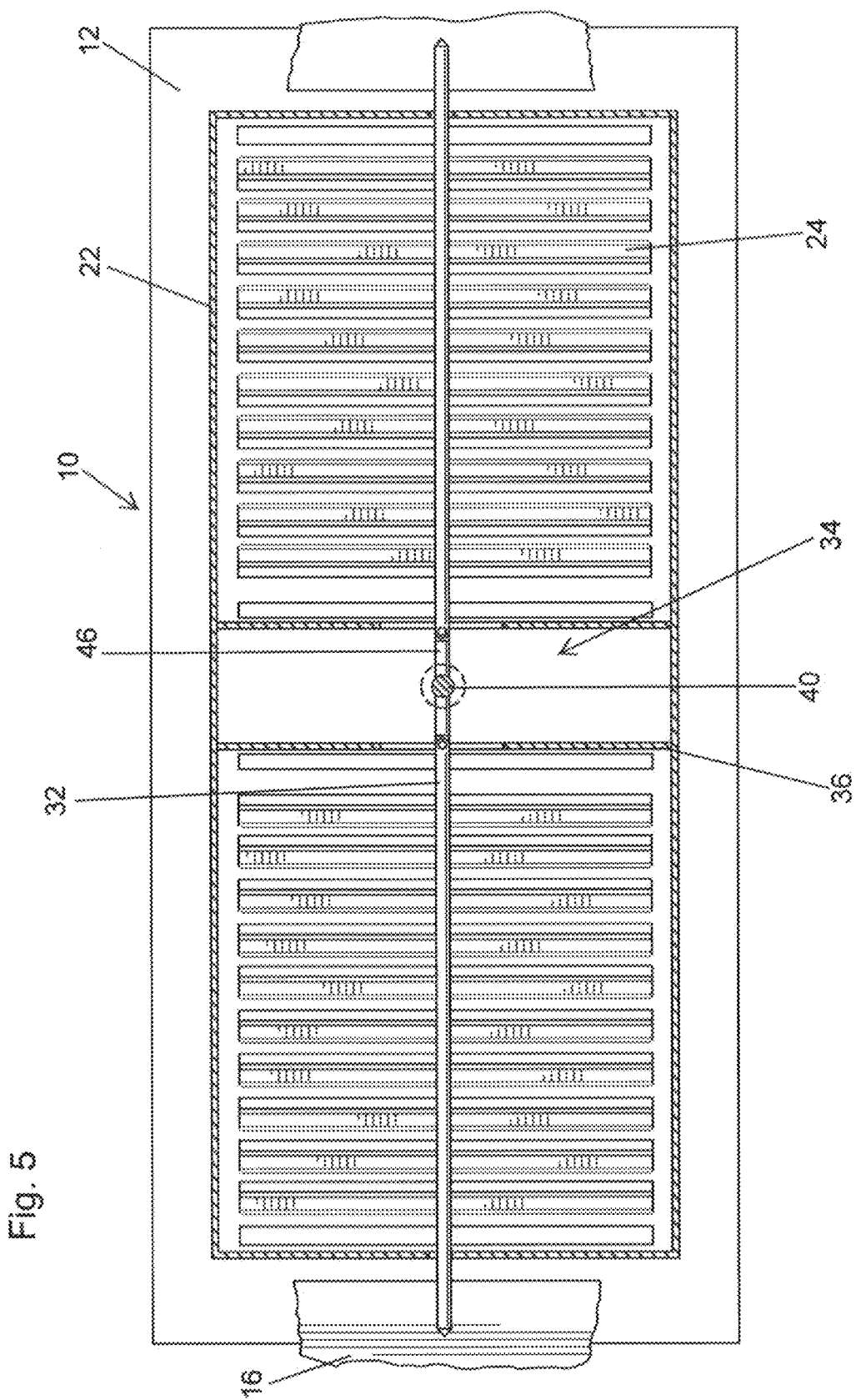
FIG. 5 is a top plan view of the wall port cover shown in FIG. 1 installed in the vent opening of the ceiling.

The wall port cover 10 is provided with engaging means to engage and release from the top or inside surface 30 of the drywall panel 16. The engaging means can be best seen from the top plan view of the wall port cover as provided in FIGS. 4 and 5. In one embodiment, the engaging means comprises arms 32 which are extendable to an engaging position (FIG. 5) and retractable to a retracted position (FIG. 4). In this embodiment, two arms are shown, however it can be appreciated that any number of arms are possible, including one, three, four, etc. The arms 32 comprise a limiting means 46 to retract and extend the arms 32. In the embodiment shown in FIG. 4, the limiting means is a hinge junction controlled by an engaging means control 40. The hinge junction allows the arms 32 to extend and retract as the engaging means control 40 is engaged. In one embodiment, the engaging means control 40 may be a rotating knob 45, or head 42 which is accessible on the front of the wall port cover 10. Alternatively, the front face of the engaging means control may take the form of a depression for engagement with a screwdriver or allen key. Alternative the engaging means control could incorporate a lock and key arrangement. When the head 42 is rotated, the hinge junction contracts allowing the arms 32 to extend or retract, depending on the direction of rotation. In FIG. 5, the engaging means control 40 is engaged such that the arms 32 are in the extended position. In the extended position, the arms 32 engage the top or inner surface 30 of the drywall panel 16, allowing the arms to be securely retained. The prevents the wall port cover from falling out during use. This is particularly useful in wall port covers which are installed on ceiling vents or wall vents, as they are at a risk of falling out easily if not fastened correctly.

In one embodiment, the wall port cover 10 may comprise a central space 34 extending upwardly from the lower surface of the wall port cover 10. The central space 34 has walls 36 extending upwardly and a top surface 38 to form a housing. The central space 34 can house the engaging means control 40. The engaging means control 40 comprises the head 42 at one end which is located below and exposed to the lower surface of the wall port cover 10. The head 42 is provided with at least one means to allow the head 42 to be rotated to move the head 42, and the engaging means control 40. The central space 34 provides room for the arms 32 to retract.

Furthermore, each of the arms 32 may comprise a retaining end which extends beyond the upstanding walls 22 of the wall port cover 10 when the arms 32 are in the extended position. It can be appreciated by a person skilled in the art, that although the retaining end is shown as pointed in the figures, a pointed end is not necessary. In the preferred embodiments the retaining ends sit adjacent the top or inner surface of the drywall panel, retaining the wall port cover in place. In some embodiments, the arms 32 could include a rounded or squared off tip. In another embodiment, the arms could be flat as opposed to the round arms shown in the figures. Furthermore, the axial location of arms 32 may be varied to allow the wall port cover to fit within any drywall size. For instance, some drywall panels may be 0.5 inches thick, while others may be 0.625 inches thick. The axial location of the arms 32 may have to be placed accordingly, therefore the arms 32 may be height-adjustable on the engaging means control 40 to fit drywall panels of varying thicknesses.

Figure 6C:
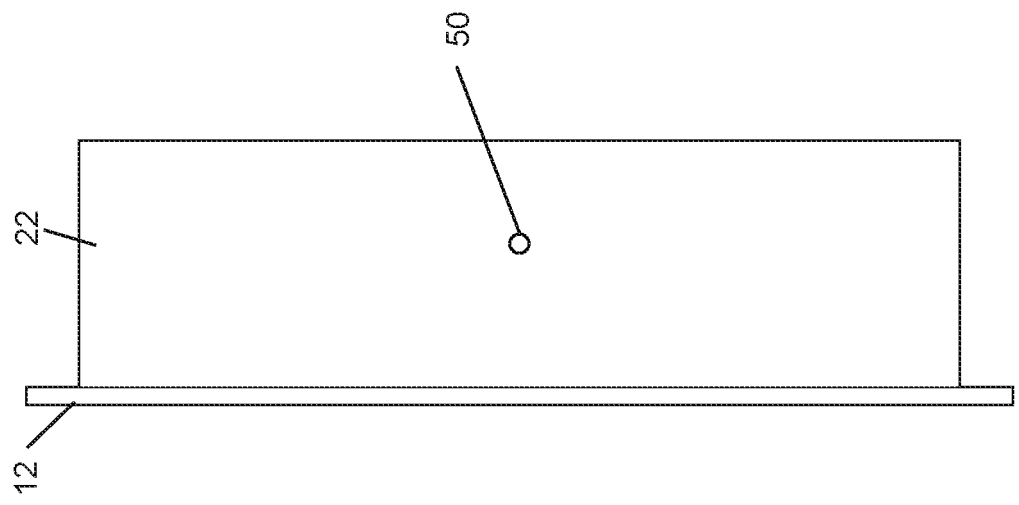
FIG. 6C is a side view of a fourth embodiment of a wall port cover shown in isolation.
Figure 6B:
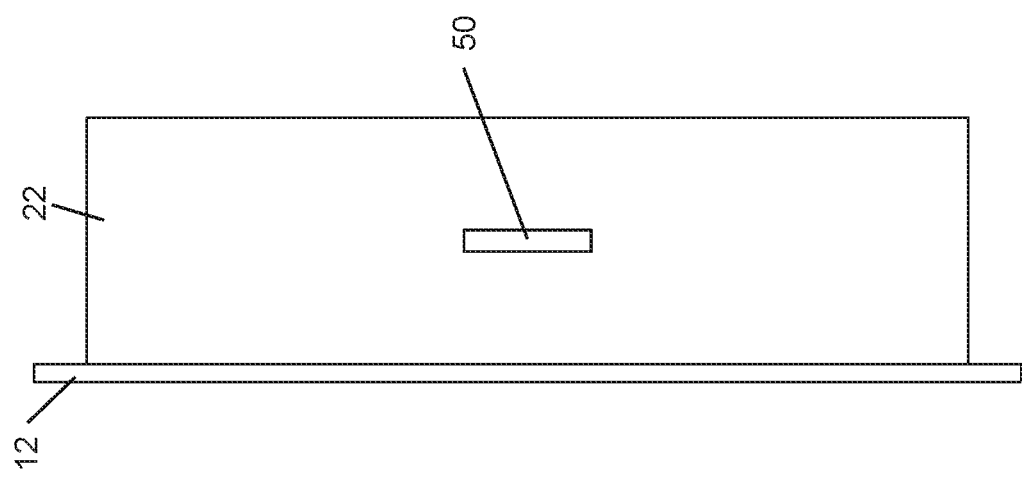
FIG. 6B is a side view of a third embodiment of a wall port cover shown in isolation.
Figure 6A:
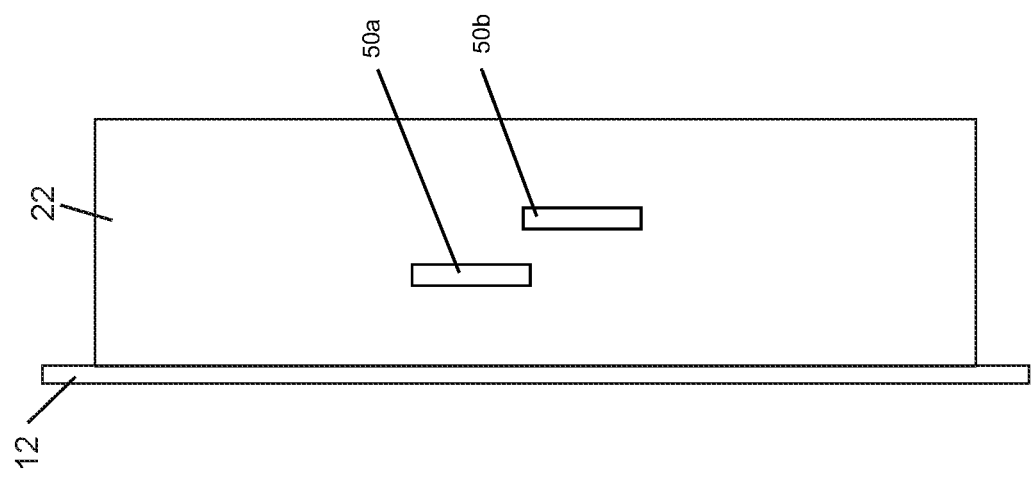
FIG. 6A is a side view of a second embodiment of a wall port cover shown in isolation.

The upstanding walls 22 of the wall port cover 10 are provided with an opening 50 through which the engaging means arms 32 extend. The opening 50 is best shown in FIGS. 6A, 6B and 6C. The opening 50 may be any suitable shape to fit the retaining end of the arms 32. For example, the opening 50 shown in FIG. 6B is rectangular; and the opening 50 shown in FIG. 6C is circular. The opening 50 may also be larger than the circumference of the arm to allow for movement of the arms 32 along the length of the opening 50 during retraction or extension. Multiple openings shown as 50a and 50b in FIG. 6A may also be present to allow the wall port cover to fit with multiple predetermined drywall sizes. It can be appreciated that the positioning of the openings could be varied during manufacture to accommodate any drywall thickness. For instance, some drywall panels may be 0.5 inches thick, while others may be 0.625 inches thick. In the example shown in FIG. 6A, opening 50b may be used for thicker drywall, while opening 50a may be used for thinner drywall. By providing a plurality of openings, a secure a secure and snug fit of the wall port cover to the drywall is facilitated. Although the examples show only one or two openings, it can be appreciated the embodiment could be amended to accommodate more than two openings FIG. 7 provides a detailed view of an embodiment of the engaging means control 40 and the engaging means in the released position. The arms 32 extend or retract when the head 42 is rotated, allowing the hinge junction to contract or relax, depending on the direction of rotation. The head to be rotated may be in the form of a rotating knob 45, such that the head may be rotated by hand. In the preferred embodiment illustrated, the head 42 is provided both with a socket 44 to allow for suitable tools such as a screwdriver or other tool to engage the head 42 and knurling 45 to allow the head to be rotated by hand. The socket 44 may allow any suitable tools such as a screwdriver, plier, wrench or other tool to engage the head 42 and allow the tool to rotate the head 42 and the engaging means control 40.

FIG. 8 provides a detailed view of the preferred embodiment of the engaging means control 40 and the engaging means in the engaged position. The upper end of the engaging means control 40 is connected to the top surface 38 of the central space 34 to retain the engaging means control 40 within the central space 34. The arms 32 extend from either side of the engaging means control 40, one end of the arm 32 being attached the engaging means control 40 and the other end of the arm 32 being pivotally attached to the limiting means 46. The sidewalls 36 of the central space 34 are provided with slots 48 through which the engaging means arms 32 pass and are connected to the arms 32 of the engaging means control 40. As the rotating head 42 is rotated, the engaging means control 40 also rotates. In this way, the limiting means contracts or expands. In another embodiment, the limiting means may comprise a winding arm which shortens as the engaging means control 40 is rotated in a first direction and lengthens as the engaging means control is rotated in a second direction.

Figure 9:
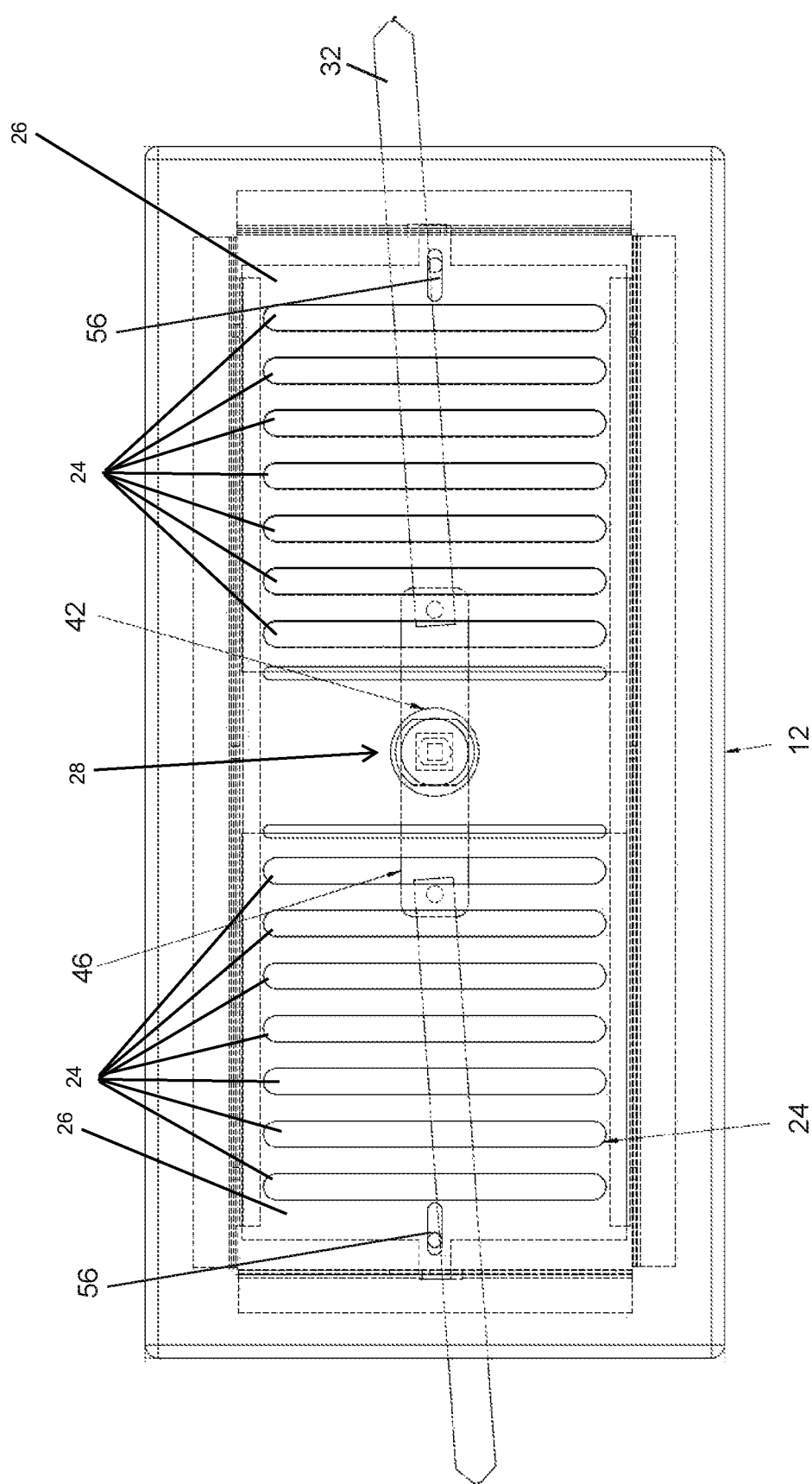
FIG. 9 is a top plan view of a fifth embodiment of the wall port cover shown in isolation.

FIG. 9 provides a top plan view of another embodiment of the wall port cover shown in isolation. In this embodiment, the wall port cover comprises a pair of arms 32 which are flattened in order to promote retention with the drywall panel. Additionally, the head 42 may comprise a locking mechanism to secure the arms in the contracted or relaxed position. The locking mechanism may be coupled to a key which allows a user to engage the head 42 of the engagement means control 40. In this embodiment, the limiting means 46 is flatter to accommodate the shape of the flat arms 32.

Figure 10:
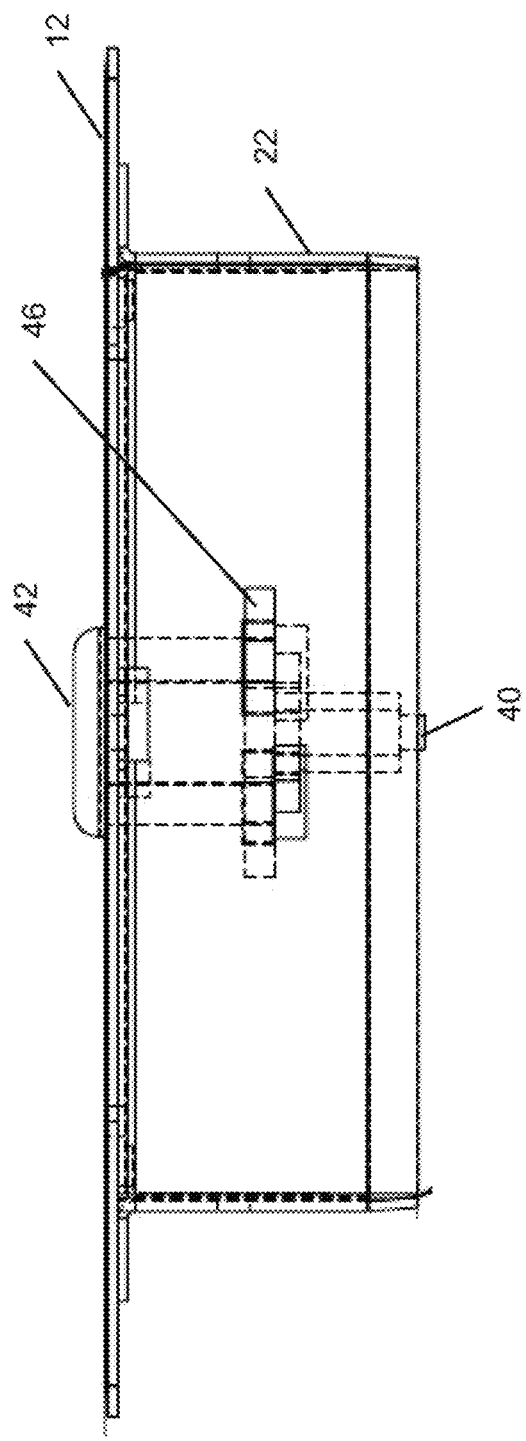
FIG. 10 is a side view of the fifth embodiment of the wall port cover shown in FIG. 9.
Figure 11:
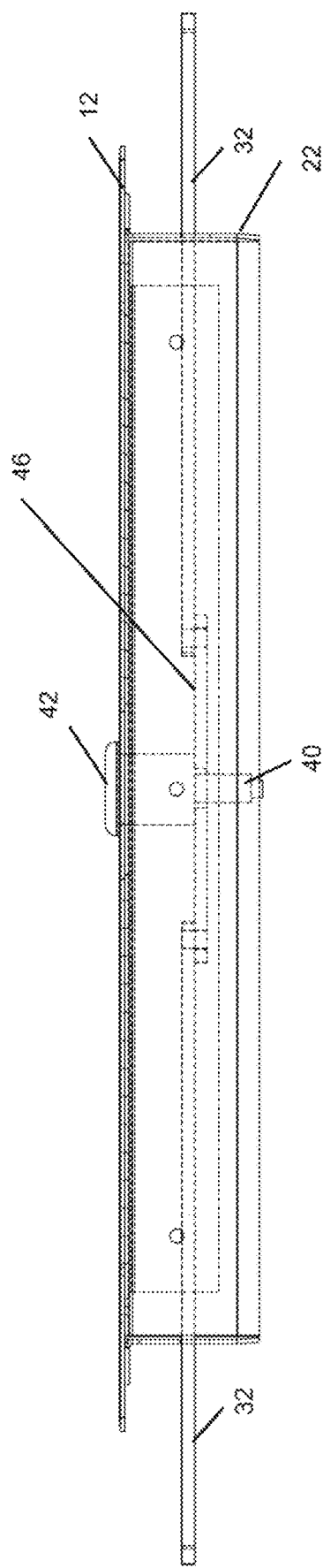
FIG. 11 is a front view of the fifth embodiment of the wall port cover shown in FIG. 10.
Figure 12:
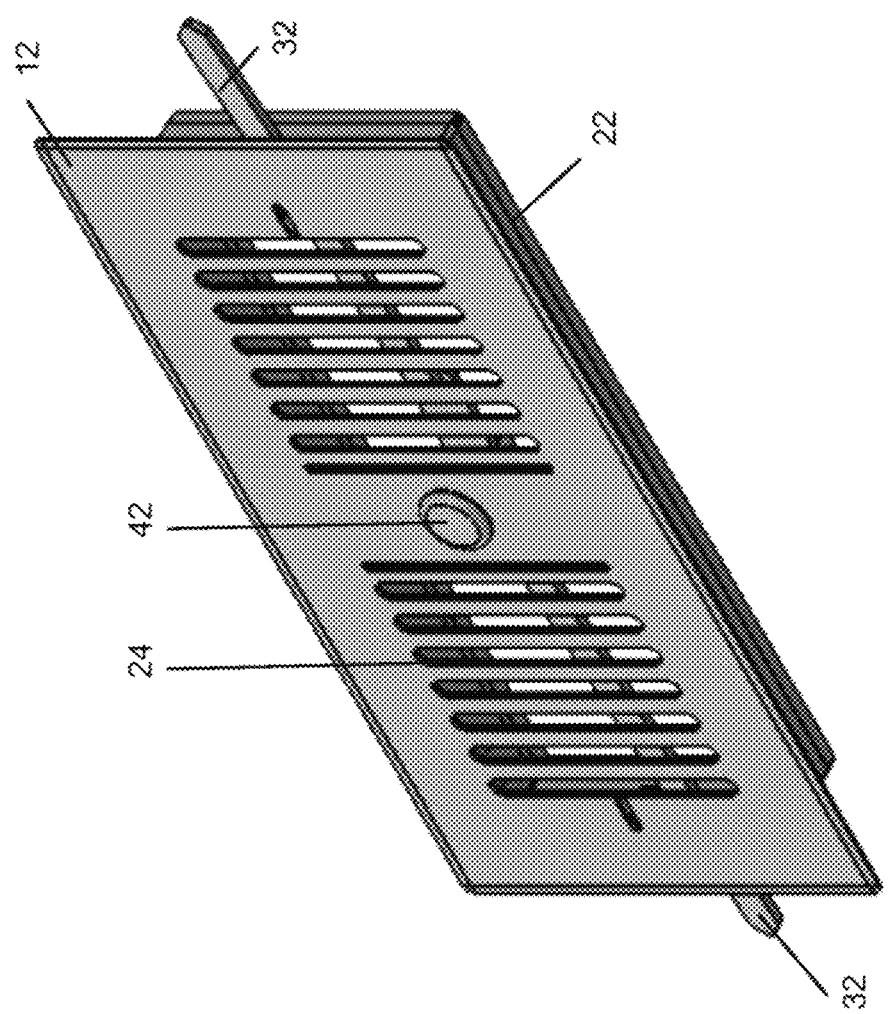
FIG. 12 is a perspective view of the fifth embodiment of the wall port cover shown in FIG. 11.

FIG. 10 provides a side view of the wall port cover shown in FIG. 9. The limiting means 46 is shown in a retracted position, as the arms 32 of the engagement means control 40 are released from the upstanding walls 22. FIG. 11 provides a front view of the wall port cover shown in FIG. 9. The limiting means 46 is shown in the extended position, and the arms 32 of the engagement means control 40 extend beyond the upstanding walls 22. FIG. 12 provides a perspective view of the wall port cover shown in FIG. 11. The flattened arms 32 pass through openings 50 of the upstanding walls 22. Here it can be appreciated that the elongated openings shown in FIG. 6B would be required to fit the arms 32.

Figure 14A:
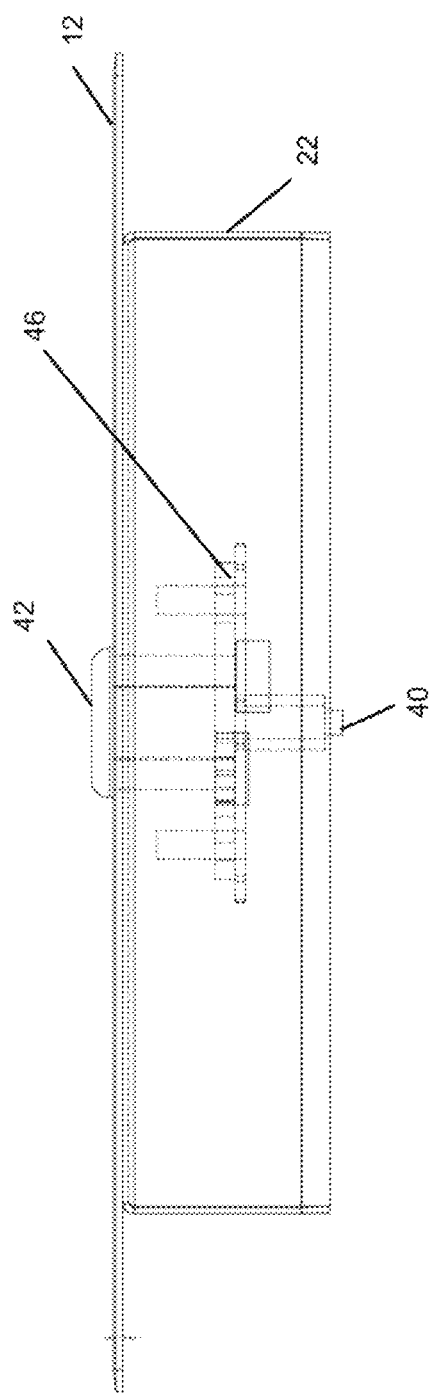
FIG. 14A is a side view of the sixth embodiment of the wall port cover of FIG. 13 in a released position.
Figure 14B:
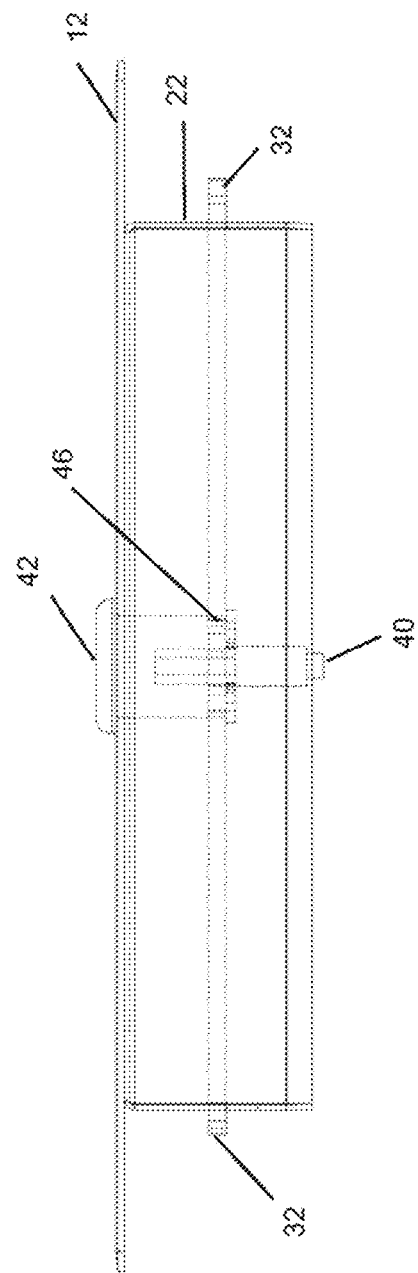
FIG. 14B is a side view of the sixth embodiment of the wall port cover of FIG. 13 in an engaged position.

FIG. 13 provides a top plan view of yet another embodiment of the wall port cover shown in isolation. In this embodiment, the wall port cover is square in shape, but it can be appreciated that the wall port cover may be of any suitable shape or size. This may be helpful for wall ports which are large, small, or oddly shaped. For instance, the square shaped wall cover may be useful in electrical or lighting or ventilation access panel installations. In these embodiments, the louvres may not be required. FIG. 14A provides a side view of the wall port cover of FIG. 13 in a released position and FIG. 14B provides a side view of the wall port cover of FIG. 13 in an engaged position. As the head 42 is rotated, the engagement means control 40 is spun, allowing the attached limiting means 46 to rotate accordingly. This causes the arms 32 to extend outward and pass through openings 50 in the upstanding walls 22.

Figure 15:
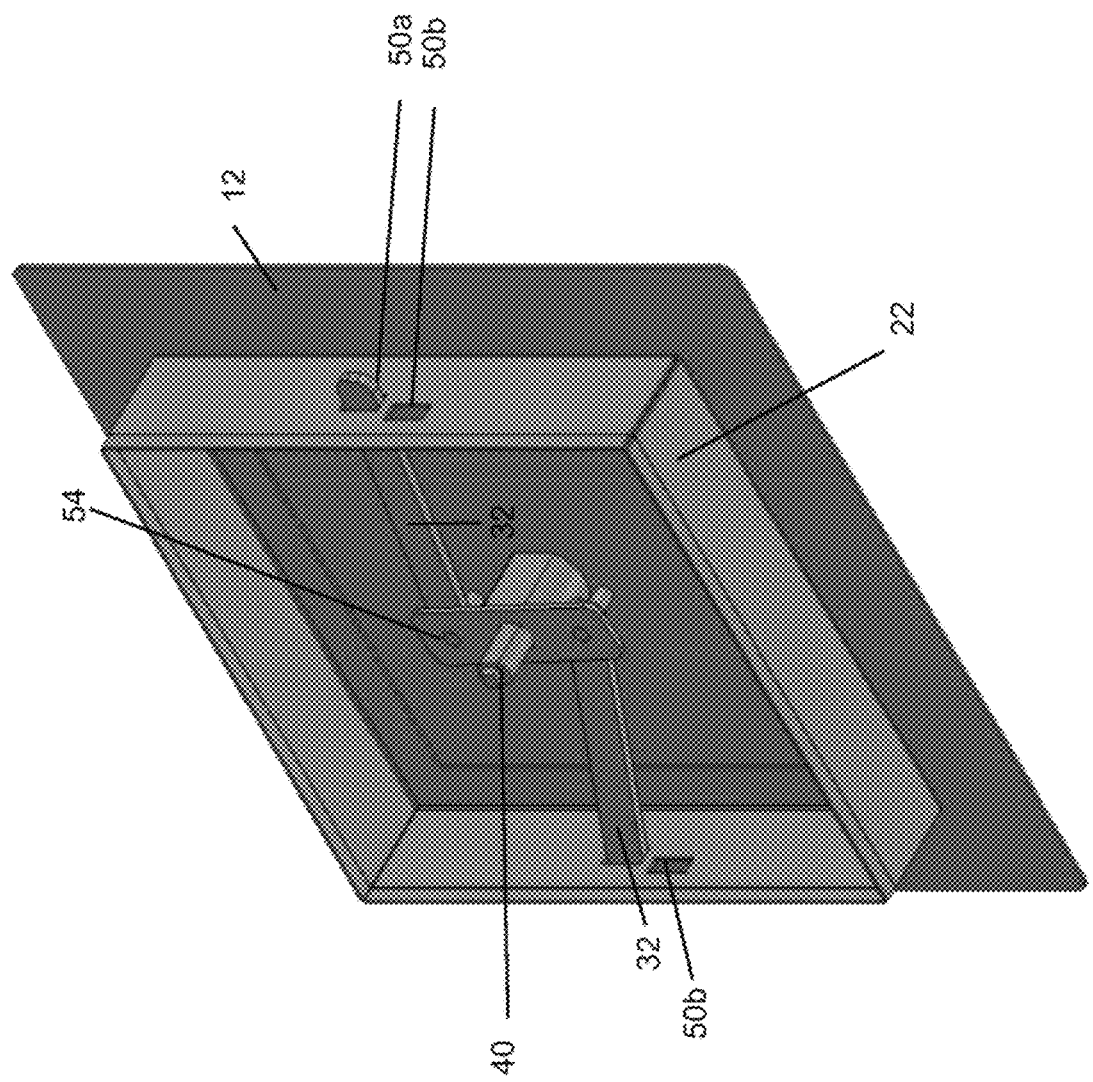
FIG. 15 is a rear perspective view of the sixth embodiment of the wall port cover shown in FIG. 11.

FIG. 15 provides a rear perspective view of the wall port cover shown in FIG. 11. In this embodiment, multiple openings 50a and 50b are present to allow the wall port cover to fit within any drywall size. For instance, a first drywall panel may be 0.5 inches thick, while another may be 0.625 inches thick. The opening 50a is relatively lower on the upstanding wall 22, to fit the 0.5-inch-thick drywall panel. The opening 50b is relatively higher on the upstanding wall 22, to fit the 0.625-inch-thick drywall panel. Therefore, the distance between the plane 12 and the opening 50 on the upstanding wall 22 is related to the thickness of the drywall panel. Furthermore, the axial location of arms 32 may be varied to allow the wall port cover to fit within any drywall size. The axial location of the arms 32 may have to be placed accordingly, therefore the arms 32 may be height-adjustable on the engaging means control 40 to fit drywall panels of varying thicknesses.

The engaging means may also be provided as a retrofit assembly to enable a user to convert an existing wall port cover into a wall port cover having engaging means suitable for ceiling or wall vents. The retrofit engaging means comprises: the engaging means control 40, the arms 32 extending from the engaging means control 40, the limiting means and the housing 36, 38. The user may cut openings 50 in the upstanding walls of an existing wall port cover, in order to allow the arms 32 to pass through. The user may also cut a further opening at the lower surface of the wall port cover to allow the head 42 to pass through the louvres 24 and be exposed to the lower face of the wall port cover 10.

In operation, the wall port cover 10 is inserted into the opening 18 of the drywall panel 16. Once the wall port cover 10 is inserted into the opening 18, the engaging means control 40 is rotated to extend the arms 32 beyond the wall port cover upstanding walls 22 to engage the top surface 30 of the drywall panel 16. In this way, the wall port cover 10 is retained in the opening as a result of the flange 12 resting against the lower surface 14 of the drywall panel 16 and the engaging means arms 32 resting against the top surface 30 of the drywall panel 16. Should it be necessary to remove the wall port cover from the opening the engaging means control 40 is rotated to withdraw the engaging means arms 32 into the interior of the wall port cover 10 and allow the wall port cover 10 to be removed from the opening 18.

The wall port cover of the present invention may be constructed of any suitable materials as is known in the art. For example, the wall port cover may be constructed of metal components, either pressed or cast. The wall port cover may also be constructed of suitable plastic materials, either by molding, casting or other known methods. The wall port cover may also be constructed of a combination of plastic and metal components. Those of skill in the art would readily appreciate the method of construction of the wall port cover.

While the present invention has been described and illustrated with respect to openings within ceilings and walls, it will be readily appreciated those of skill in the art that the same structure of the wall port cover may also be utilized for openings within walls and floors of a building. The wall port cover can be used to cover any wall port, or opening found in drywall paneling. Although preferred embodiments of the present invention have been described herein in detail, it will be readily appreciated by those of skill in the art that variations may be made thereto without departing from the spirit of the invention.

The invention claimed is:

1. A wall port cover for a wall port comprising:
   a lower face;
   a flange extending outwardly from the lower face;
   upstanding walls extending upwardly from the flange to engage an inside surface of the wall port and comprising openings; and
   an engaging means comprising:
   an engaging means control having a head at a first end located below and exposed to the lower face of the wall port cover;
   at least one arm extending from the engaging means control; and
   a limiting means coupled to the arm for contracting and relaxing the arms of the engaging means control;
   wherein the head is rotatable in at least two directions such that when the head is rotated in a first direction, the at least one arm extends from the engaging means control to be in an extended position and when the head is rotated in a second direction, the at least one arm retracts from the engaging means control to be in a retracted position; and
   wherein the at least one arm in the extended position passes through and extends beyond the openings of the upstanding walls and the at least one arm in the retracted position stays within the upstanding walls of the wall port cover;
   wherein the wall port cover further comprises a central space defined by side walls having a slot and a top surface to provide space for the at least one arm to retract; and
   wherein the engaging means control further comprises an upper end connected to the top surface of the central space to retain the engaging means control within the central space.

2. The wall port cover according to claim 1, wherein the lower face comprises a first set of louvres to direct air flow from the wall port.

3. The wall port cover according to claim 2, wherein the wall port cover further comprises a second set of louvres to limit air flow from the wall port.

4. The wall port cover according to claim 1, wherein the head of the engaging means control comprises a knurling to allow the head to be rotated by hand.

5. The wall port cover according to claim 1, wherein the head of the engaging means control comprises a socket to allow the head to be rotated by a tool.

6. The wall port cover according to claim 1, wherein the limiting means comprises a hinge junction.

7. The wall port cover according to claim 1, wherein the limiting means comprises a winding arm which shortens as the head is rotated in the first direction and lengthens as the head is rotated in the second direction.

8. The wall port cover according to claim 1, wherein the engaging means control further comprises an upper end connected to the top surface of the central space to retain the engaging means control within the central space.

9. A retrofit engagement assembly for a wall port cover having
   a lower face,
   a flange extending outwardly from the lower face,
   upstanding walls extending upwardly from the flange to engage an inside surface of a wall port comprising:
   an engaging means control having a head;
   at least one arm extending from the engaging means control; and
   a limiting means coupled to the arm for contracting and relaxing the arms of the engaging means control;
   wherein the head is rotatable in at least two directions such that when the head is rotated in a first direction, the at least one arm extends from the engaging means control to be in an extended position and when the head is rotated in a second direction, the at least one arm retracts from the engaging means control to be in a retracted position
   wherein the wall port cover further comprises a central space defined by side walls having a slot and a top surface to provide space for the at least one arm to retract; and
   wherein the engaging means control further comprises an upper end connected to the top surface of the central space to retain the engaging means control within the central space.

10. The retrofit engagement assembly according to claim 9, wherein the head of the engaging means control comprises a knurling to allow the head to be rotated by hand.

11. The retrofit engagement assembly according to claim 9, wherein the head of the engaging means control comprises a socket to allow the head to be rotated by a tool.

12. The retrofit engagement assembly according to claim 9, wherein the limiting means comprises a hinge junction.

13. The retrofit engagement assembly according to claim 9, wherein the limiting means comprises a winding arm which shortens as the head is rotated in the first direction and lengthens as the head is rotated in the second direction.

14. The retrofit engagement assembly according to claim 9, wherein the engagement assembly further comprises a central space defined by side walls having a slot and a top surface to provide space for the at least one arm to retract.

* * * * *